United States Patent [19]

Chandler

[11] Patent Number: 4,889,147
[45] Date of Patent: Dec. 26, 1989

[54] CAR WASH APPARATUS

[76] Inventor: David A. Chandler, R.D. #1 Box 292, Auburn, N.Y. 13021

[21] Appl. No.: 253,770

[22] Filed: Oct. 5, 1988

[51] Int. Cl.$^4$ .................................................. B60S 3/04
[52] U.S. Cl. ..................................... 134/123; 239/551
[58] Field of Search ................. 134/45, 123, 172, 180, 134/199; 239/542, 547, 551

[56] References Cited

U.S. PATENT DOCUMENTS

| | | | |
|---|---|---|---|
| 1,183,391 | 5/1916 | Mason | 134/180 X |
| 2,598,961 | 6/1952 | Andrus | 239/542 X |
| 2,752,925 | 7/1956 | Friers | 134/123 |
| 3,321,793 | 5/1967 | Braunger | 15/302 |
| 3,342,191 | 9/1967 | Haines | 134/199 X |
| 3,459,377 | 8/1969 | Van Der Hulse | 239/551 X |
| 3,795,254 | 3/1974 | Blosser | 134/123 |
| 4,788,993 | 12/1988 | Beer et al. | 134/172 X |

FOREIGN PATENT DOCUMENTS

| | | | |
|---|---|---|---|
| 1953027 | 5/1970 | Fed. Rep. of Germany | 134/123 |
| 509564 | 7/1939 | United Kingdom | 134/123 |
| 1059920 | 2/1967 | United Kingdom | 134/45 |

Primary Examiner—Philip R. Coe

[57] ABSTRACT

A portable car wash apparatus that includes an upright U-shaped piping system partially circumscribing a car travel space. Water spray jets are located at various points along the piping system, such that when a car is driven through the circumscribed space jets of water are sprayed onto the car surface. The apparatus will clean the roof and side areas of the vehicle, as well as the underbody areas that are relatively inaccessible.

4 Claims, 1 Drawing Sheet

CAR WASH APPARATUS

BACKGROUND OF THE INVENTION

This invention relates to a portable car wash apparatus comprising an upright U-shaped piping system having a number of spray nozzles targeted on a central zone encompassed by the U shaped system. As a car slowly moves through the central zone the spray nozzles spray the car surface to remove dirt accumulations. The apparatus is designed to spray underbody areas of the vehicle, as well as side areas and roof areas.

Prior to my invention others have proposed somewhat similar car washing apparatus. U.S. Pat. No. 3,321,793 to A. Braunger shows a horizontal piping system installed in two laterally-spaced pits for directing jets of steam upwardly against the underbody of a vehicle; the aim is to remove ice and salt accumulations from underbody areas of the vehicle that are relatively inaccessible.

U.S. Pat. No. 3,795,254 to N. Blosser is quite similar to the Braunger patent except that the piping system is located above-ground rather than below-ground. In Blosser 3,795,254 the piping system is apparently laid on a garage floor; the vehicle is driven into the garage until it is located above the piping system. A garden hose supplies water to the piping system, which directs the water in spray form against the vehicle underbody and outer side areas of the vehicle.

SUMMARY OF THE INVENTION

My invention relates to a portable car wash apparatus that can be set up on a driveway, or other flat surface, without requirement for permanent changes in the driveway surface. In this sense, my apparatus is believed to be an improvment over the pit-type arrangement shown in Braunger 3,321,793.

My proposed arrangement contemplates a comparatively small number of fixed spray nozzles occupying an imaginary plane transverse to the path taken by an automobile. As the automobile passes through the imaginary plane the fixed nozzles direct jets of water against moving surface areas of the vehicle; only a few nozzles are required to completely cover the entire vehicle surface. The proposed arrangement is believed to be a departure from the arrangement suggested in Blosser 3,795,254 wherein the vehicle is in a stationary position during the wash cycle; the Blosser arrangement requires a large number of nozzles to effect a cleaning operation along the full length of the vehicle.

A preferred embodiment of my invention comprises two upstanding pipe sections located alongside the path taken by the vehicle. Nozzles are located at different points on the upstanding pipe sections to spray liquid onto roof and side areas of the vehicle. An aim of my invention is to effect a substantially complete coverage of the vehicle, including the roof areas, side areas, and vehicle underbody.

Preferably the spray nozzles are adjustable as regards the angle of spray discharge, whereby the spray directions can be altered to achieve optimum coverage on a range of different size vehicles. Also, the individual nozzles are preferably capable of being closed without interrupting liquid flow through the piping system; the aim is to permit selective coverage of different surface areas on the vehicle, e.g. when one area requires a more concentrated cleaning action than another area.

A general object of my invention is to provide a portable car wash apparatus that is manufacturable at relatively low cost, while still being capable of automatically spraying an entire vehicle. Another object is to provide an apparatus that is usable on a variety of differently sized and differently contoured vehicles.

THE DRAWINGS

DESCRIPTION OF THE PREFERRED EMBODIMENT OF THE INVENTION

Figure 1:
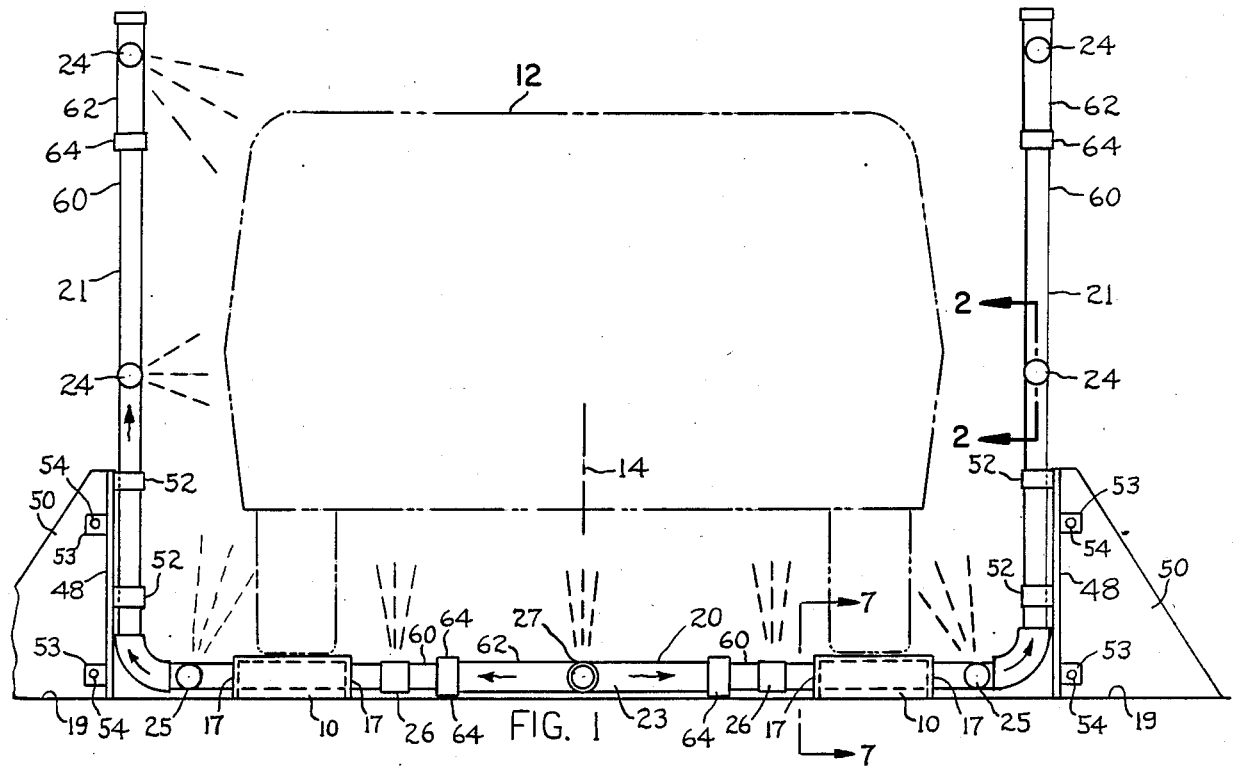
FIG. 1 is an elevational view of car wash apparatus embodying my invention.

FIG. 1 illustrates one form that the invention can take. The illustrated apparatus comprises two laterally-spaced wheel ramps 10 arranged so that a passenger car 12 can move over the ramps normal to the plane of the paper (FIG. 1), i.e. along a car movement axis 14 spaced equidistantly between the two ramps.

Each ramp 10 may be of conventional design, comprised of two wheel-engagement sections 15 and 16 (FIG. 4), and two vertical side walls 17 (FIG. 1). The ramps are portable devices that can be manually placed on a driveway surface 19, or other surface of sufficient length to permit a vehicle to be driven over the two ramps.

Figure 7:
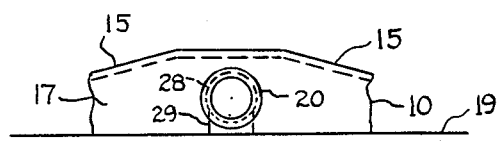
FIG. 7 is a fragmentary sectional view taken on line 7—7 in FIG. 1.

A U-shaped piping system is arranged in a vertical plane extending transverse to car-movement axis 14. The piping system comprises a horizontal pipe section 20 and two upstanding pipe sections 21; each pipe section is preferably formed of light weight rigid plastic tubing. A garden hose attachment fitting 23 is located at a central point on pipe section 20, whereby water flows from fitting 23 in opposite directions along pipe section 20, thence upwardly through pipe sections 21, as indicated by the arrows in FIG. 1. Slots 29 (FIG. 7) are formed in ramp side walls 17 to accommodate pipe section 20; pipe section 20 passes through the ramps to deliver water to pipe sections 21. The sole purpose for the ramps is to permit the vehicle to pass over pipe section 20 without destroying or injuring the pipe section.

Pipe sections 20 preferably have snap-type connections with ramp side walls 17. In one possible arrangment grooves 28 (FIG. 7) are formed in the pipe side wall for snap-on engagement with a keyhole slot 29 in each ramp side wall. If the pipe is formed of rigid plastic tubing it will have enough resilience to snap into or out of slot 29.

At least one spray nozzle is located in each of the three pipe sections 21, 20, 21. In the FIG. 1 arrangement two nozzle assemblies 24 are located in each pipe section 21. One of these nozzle assemblies is located at the upper end of the pipe section to spray water onto the roof and upper side areas of the vehicle; the other nozzle assembly is located about midway up the vertical height of pipe section 21 to spray the lower side area of the vehicle.

Horizontal pipe section 20 contains four nozzle assemblies 25 and 26; plus one additional nozzle assembly 27. Nozzle assemblies 25 are located near the outer ends of pipe section 20 to direct jets of water upwardly against the outboard areas of the vehicle underbody, i.e. the rocker panels and the wheel wells. Nozzle assemblies 26 are located inboard from nozzle assemblies 25 to spray jets of water into central areas of the vehicle underbody, while nozzle assembly 27 directs a spray upwardly along the vehicle centerline. Nozzle assemblies 26 and 27 may be angled to the plane of the paper (in FIG. 1) to direct jets of water onto the vehicle grille-bumper area (if the vehicle is moving forwardly) or onto the vehicle rear deck (if the vehicle is moving rearwardly).

Figure 3:
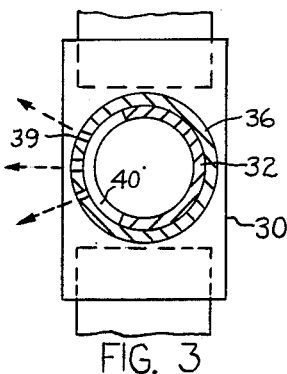
FIG. 3 is a sectional view on line 3—3 in FIG. 2.
Figure 2:
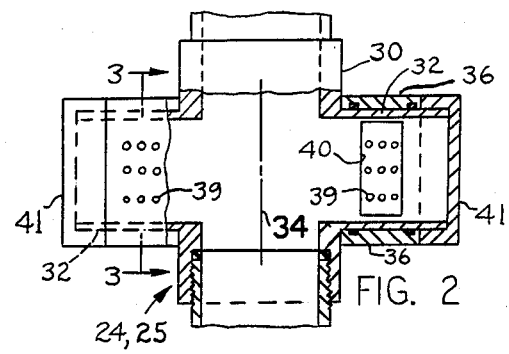
FIG. 2 is a fragmentary sectional view on line 2—2 in FIG. 1.
Figure 5:
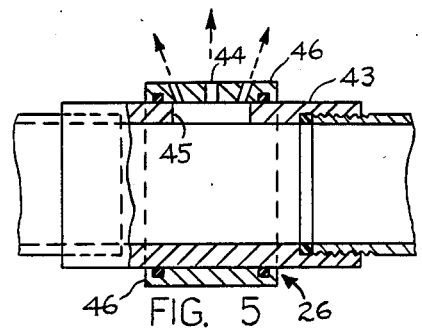

The individual nozzles 24, 25, 26 and 27 are preferably commercial hardware items having shut-off capabilities, whereby selected ones of the nozzles may be closed to concentrate the water sprays on other areas of the vehicle. For illustration purposes FIGS. 2, 3 and 5 are included to illustrate the shut-off capability. FIGS. 2 and 3 show a construction that can be used for nozzles 24 and 25. FIG. 5 shows a construction that can be used for nozzle 26.

The nozzle shown in FIGS. 2 and 3 comprises a nozzle body 30 having two tubular sections 32 extending normal to the pipe axis 34. A rotary sleeve 36 is positioned on each tubular section 32. A water flow opening 40 in each tubular section 32 supplies water to nozzle openings 39 in tubular section 32. The end of each tubular section is closed by a cap 41.

Sleeve 36 can be rotated to change the direction of flow through the nozzle or to shut-off flow. (when sleeve 36 is rotated one hundred eighty degrees from its FIG. 3 position). Each nozzle assembly (FIG. 2) includes two individual nozzles that can be adjusted or closed individually.

The nozzle shown in FIG. 5 comprises a tubular section 43 having a flow opening 45 for supplying water to nozzle openings 44 in a rotary sleeve 46. The sleeve can be rotated to vary the spray discharge angle or to shut off the nozzle (without stopping flow through the pipe system).

Figure 4:
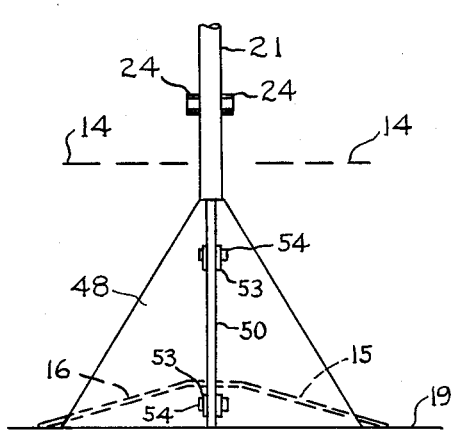
FIG. 4 is a right elevational view of the FIG. 1 apparatus.

FIGS. 1 and 4 illustrate one method of supporting the U-shaped pipe system in an upright position; other methods may be utilized. The illustrated support system comprises two support stands clamped to pipe sections 21. Each support stand includes a triangularly shaped plate 48 (FIG. 4). and a second plate 50 normal to plate 48; the two plates are detachably connected to form a tripod-type stand. Hose clamps 52 (or their equivalent) clamp pipe section 21 to the associated stand.

Any suitable connector mechanism may be used to connect each plate 48 to the associated plate 50. For example, channels 53 may be attached to plate 48 to receive edge areas of plate 50; nut-bolt assemblies 54 may be extended through the channels and plate 48 to form detachable connections between plates 48 and 50.

The illustrated piping system is preferably capable of being knocked down into a relatively small package for storage or transport. Preferably the right angle connection between pipe section 20 and each pipe section 21 is a breakable connection, e.g. a threaded connection.

In preferred practice of the invention the various nozzles are predetermined distances away from the target surfaces on the vehicle body. Unfortunately vehicles vary in height and width (one model to another). Full size station wagons have tire-to-tire center spacings of about sixty three inches, whereas compact cars have a corresponding spacing of only about fifty inches. Vehicle heights also vary.

Figure 6:
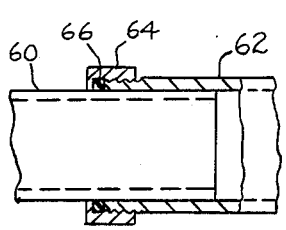
FIGS. 5 and 6 are enlarged fragmentary sectional views showing structural details that can be employed in the FIG. 1 apparatus.

I contemplate that the three pipe sections 21, 20 and 21 will each be adjustable in length to permit the various spray nozzles to perform efficiently on a range of different size vehicles. FIG. 6 illustrates a telescoping joint that can be used to increase or decrease the length of a given pipe section (21, 20 and 21).

FIG. 6 shows a first tube 60 telescoped into a second tube 62. An annular collar 64 has a threaded connection on tube 62, so that an annular resilient sealing element 66 is trapped between the collar and the end of tube 62. As the collar is threaded onto tube 62 it compresses sealing element 62, such that the sealing element is deformed to tightly grip the outer surface of tube 60. Sealing element 66 prevents water leakage out of the tube joint and also acts as a tube gripper mechanism to prevent inadvertant sliding play between the tubes.

The telescoping connection of FIG. 6 can be employed in pipe sections 21, as well as in pipe section 20. FIG. 1 shows two collars 64, 64 threaded onto opposite ends of a centrally-located tube 62; a tube 60 extends into each end of tube 62 for adjustment into or out of tube 62. Each vertical pipe section 21 comprises a tube 62 having a telescopic connection on a tube 60.

As respects pipe section 20, the pipe length adjustment mechanism is designed so that each nozzle 25 is spaced a constant distance from the adjacent nozzle 26; the length adjustment takes place inboard from nozzle 26. Each ramp 10 is positioned about midway between the associated nozzles 25 and 26 (irrespective of the adjustments of tubes 60 into or out of tube 62). The adjustment system is designed to permit the various spray nozzles to be optimally located irrespective of the vehicle size (widthwise and heigthwise).

If desired, the car wash system can incorporate a detergent injection feature, as shown broadly in U.S. Pat. No. 4,580,726 to M. Unger (at 28 in the patent drawings). In my proposed system the detergent injection apparatus would be located at the hose attachment fitting 23.

In a preferred arrangement all of the spray water is supplied through hose attachment fitting 23. Normally the hose will be connected to a spigot at the user's home; a manual valve on the spigot will be opened to introduce water to the hose and the FIG. 1 apparatus. To minimize water usage a control valve can be mounted on attachment fitting 23 to permit water flow to the car wash apparatus only when the car is within the area covered by the spray nozzles; the control valve could be operated by an air tube system arranged in the path of the vehicle tires or by deflectable sensor arms in the path of the vehicle bumper, etc.

The drawings show one form that the invention can take. Other forms are possible.

I claim:

1. Portable car wash apparatus comprising two laterally-spaced wheel ramps defining a car-movement axis; a U-shaped piping system comprising a horizontal piping section extending through both of said ramps transverse to the car-movement axis, and two upstanding piping sections extending upwardly from the ends of the horizontal piping section;

and spray nozzle means in each piping section targeted toward the zone encompassed by the piping system, whereby a car moving along the car-movement axis will have outer surface areas thereof sprayed by the nozzles;

said horizontal piping section including a centrally located water intake tube (62) and an outboard tube (60) telescopically extending into each end of the centrally located tube so that the horizontal piping section can have its located overall length adjusted without changing the position of the centrally located tube relative to the car movement axis;

said wheel ramps being located outboard from said centrally located tube to provide ramp surfaces over each outboard tube (60); said spray nozzle means including a spray nozzle (26) on each outboard tube inboard from the associated wheel ramp, and a spray nozzle (25) on each outboard tube outboard from the associated wheel ramp.

2. The apparatus of claim 1, wherein each upstanding piping section comprises a lower tube and an upper tube telescopically connected to the associated lower tube for vertical adjustment thereon; said nozzle means including a spray nozzle on each lower tube and a spray nozzle on each upper tube.

3. The apparatus of claim 2, wherein each spray nozzle comprises a tubular flow duct (32) having an annular duct wall formed with a circumferentially extending flow opening (40 or 45), and a manually rotatable sleeve encircling said duct, each said sleeve having a number of water nozzle ports therethrough adapted to register with the associated flow opening; each sleeve being rotatably adjustable on the associated flow duct to alter the angle of discharge through the nozzle or to discontinue flow out of the nozzle without interrupting water flow through the piping system.

4. The apparatus of claim 1, and further comprising a collar threaded onto each end of said centrally located tube, and an annular resilient sealing element (66) trapped between each collar and the associated end of the tube whereby manual rotation of the collar compresses the sealing element into gripping engagement with the outer surface of associated outboard tube.

* * * * *